United States Patent
Lodolo et al.

(10) Patent No.: US 7,251,726 B2
(45) Date of Patent: Jul. 31, 2007

(54) MULTIPLE FUNCTIONALITY ASSOCIATED WITH A COMPUTER ON/OFF PUSHBUTTON SWITCH

(75) Inventors: Luca Lodolo, Sunnyvale, CA (US); Hyejung Yi, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 10/936,932

(22) Filed: Sep. 9, 2004

(65) Prior Publication Data
US 2006/0053313 A1   Mar. 9, 2006

(51) Int. Cl.
*G06F 3/00* (2006.01)
(52) U.S. Cl. .................. 713/1; 713/2; 710/10; 710/12; 710/14; 710/16; 710/17; 710/62
(58) Field of Classification Search ............... None
See application file for complete search history.

(56) References Cited

U.S. PATENT DOCUMENTS

| | | | |
|---|---|---|---|
| 5,978,923 A * | 11/1999 | Kou ........................... | 713/323 |
| 6,414,675 B1 * | 7/2002 | Shen .......................... | 345/211 |
| 6,532,152 B1 * | 3/2003 | White et al. ................ | 361/692 |
| 6,748,546 B1 | 6/2004 | Mirov et al. | |
| 6,819,961 B2 * | 11/2004 | Jacobs et al. ................ | 700/17 |
| 7,111,083 B2 * | 9/2006 | Miller ......................... | 710/10 |

* cited by examiner

*Primary Examiner*—A. Elamin

(57) ABSTRACT

The invention in one implementation encompasses a computer having an operating system and a power ON/OFF pushbutton switch. A microcontroller is coupled to receive ON/OFF information generated by the pushbutton switch. Responsive to receiving the ON/OFF information, the microcontroller generates a command causing the operating system to cause the computer to toggle between sleep and awake states.

24 Claims, 2 Drawing Sheets

MULTIPLE FUNCTIONALITY ASSOCIATED WITH A COMPUTER ON/OFF PUSHBUTTON SWITCH

BACKGROUND

This invention generally relates to computers and more specifically relates to multiple functionality associated with an ON/OFF pushbutton switch of a computer.

Computers typically utilize an ON/OFF pushbutton switch to initiate a power up sequence from a powered down (OFF) state and to power down from a powered up (ON) state. Depressing and releasing the pushbutton when the computer is OFF causes a power up sequence to be initiated. After the computer has successfully booted and reached an operational state, depressing the pushbutton for 4 seconds will cause the computer to power down regardless of the condition of a software application that may be running. Using the pushbutton to power down the computer may be necessary in the event of an irrecoverable error by the application software or the operating system. Such ON/OFF pushbutton operation satisfies requirements of the Advanced Configuration and Power Management Interface (ACPI) standard.

Laptop computers, in addition to having an ON/OFF button, are typically provided with a sleep/wakeup button. After the laptop computer has successfully booted, the user may employ the sleep/wakeup button to cycle the computer between a sleep state that conserves battery power and an active (awake) state in which application programs are made available to the user. There exists a need as will be more fully described in the Detailed Description section below.

SUMMARY

The invention in one implementation encompasses a computer having an operating system and a power ON/OFF pushbutton switch. A microcontroller is coupled to receive ON/OFF information generated by the pushbutton switch. Responsive to receiving the ON/OFF information, the microcontroller generates a command causing the operating system to toggle the computer between sleep and awake states.

Another implementation of the invention encompasses a method for using a power ON/OFF pushbutton switch of a computer to derive control of additional computer functionality. A pushbutton driver is loaded for interfacing with an operating system of the computer. In response to sensing a depression and release of the pushbutton switch, a command is generated and sent to the operating system to cause the operating system to toggle the computer from one of a sleep and awake state to the other of the sleep and awake state.

The invention in yet another implementation comprises an article. The article comprises one or more computer-readable signal-bearing media. The article comprises means in the one or more media for loading a pushbutton driver for an operating system of a computer. Other means in the one or more media provides for sensing whether the pushbutton switch is depressed and released by the user following the loading of the pushbutton driver. Further means in the one or more media provides for generating and sending a command to the operating system to cause the operating system to toggle the computer from one of a sleep and awake state to the other of the sleep and awake state in response to sensing a depression and release of the pushbutton switch.

DESCRIPTION OF THE DRAWINGS

Features of exemplary implementations of the invention will become apparent from the description, the claims, and the accompanying drawings in which:

DETAILED DESCRIPTION

Referring to the Background section above, it is recognized in accordance with an aspect of the present invention that it is beneficial to minimize the number of mechanical components needed for user inputs. This is advantageous in that the number of input devices that are subject to mechanical failure is reduced thereby enhancing reliability. Also, costs associated with the assembly of mechanical components will be reduced as the number of mechanical components is reduced. Thus, there exists a desire to incorporate the control of additional functionality by using the input of a single ON/OFF pushbutton switch. Incorporating control of the sleep/wake-up function with the ON/OFF pushbutton switch will offer the user a simpler to use input and eliminate confusion in having to decide which button to use when two separate pushbuttons are utilized.

Figure 1:
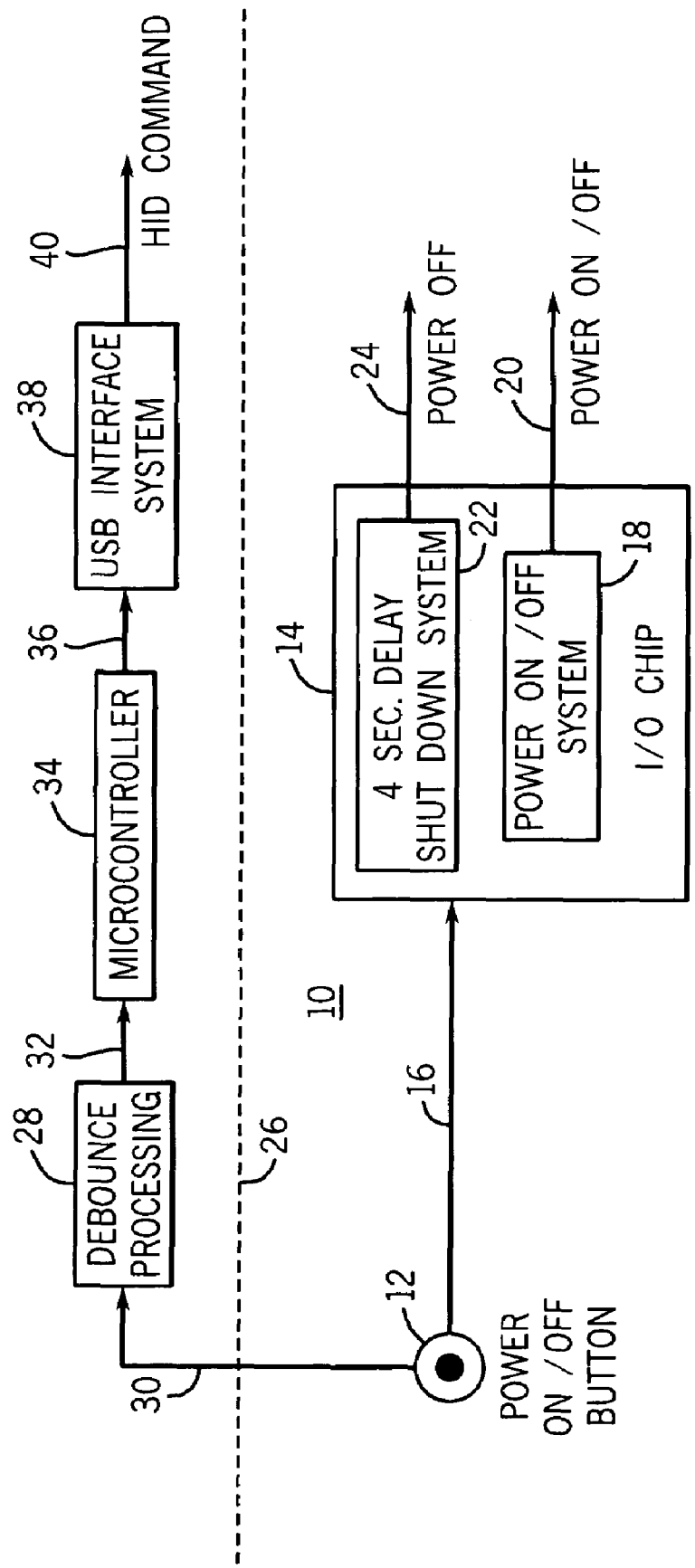
FIG. 1 is a block diagram of an exemplary implementation of computer circuitry utilized to control multiple functions based on input from a single ON/OFF pushbutton switch.

In FIG. 1 the exemplary implementation of computer circuitry 10 is shown in which the single ON/OFF pushbutton switch 12 controls functions in addition to power control in response to the activation by the user. As used herein "PB" refers to an ON/OFF pushbutton switch with a single output that is one of two states. An input/output (I/O) chip 14 is coupled to the output of PB 12 by connection 16. The I/O chip 14 includes a power ON/OFF system 18 that generates a power ON and power OFF command on output 20. Chip 14 also includes a 4 second delay shutdown system 22 that generates a power OFF command on output 24. As will be explained in more detail regard to FIG. 2, system 18 generates a power ON command in response to detection of a depression of the PB to start an initial power up of the computer and generates a power OFF command in response to detection of a depression of the PB following the beginning of the power up sequence but before the completion of the boot sequence. System 14 generates a power OFF command in response to the detection of a continuous depression of the PB for 4 seconds after the completion of the boot sequence. The portion of FIG. 1 below dashed line 26 represents a known implementation of ON/OFF control of a computer. The construction and operation of the I/O chip 14 to accomplish this task is known in the art.

Additional functionality associated with PB 12 is implemented by the circuitry shown above dashed line 26. A debounce processing circuit 28 is coupled to PB 12 by connection 30. The purpose of the debounce processing circuit 28 is to filter the bouncing of mechanical contacts associated with depression or release of PB 12 to produce a clean single output signal on output 32 representing either a closing or opening of the contacts associated with PB 12. The debounce processing circuit 28 may comprising a one-shot monostable with a cycle time selected to be longer than the bouncing time associated with the mechanical contacts of PB 12.

A microcontroller 34 receives the output signal from the debounce processing circuit 28 and determines whether a sleep or wake-up command is to be generated on output 36 based on the current sleep/awake state of the computer, assuming the computer is in an operational state following a successful boot up sequence. In the exemplary implementation, microcontroller 34 generates commands on output 36 in the form of a universal serial bus (USB) signal. A USB interface system 38 receives the USB signal on output 36, recognizes the signal as corresponding to one of the sleep and wake-up commands, and generates a signal on output 40 corresponding to human interface device (HID) commands. Predefined separate HID commands correspond to a sleep command and a wake-up command, and are preferably compatible with ACPI standards associated with operating system level control. Output 40 is coupled as an input to the operating system such as by a predefined USB device driver associated with the sleep/wake-up functionality defined as a USB device. It is the responsibility of the operating system in combination with any application programs directed to the sleep/awake function to control the sleep/awake mode of the computer in response to commands received on output 40.

Figure 2:
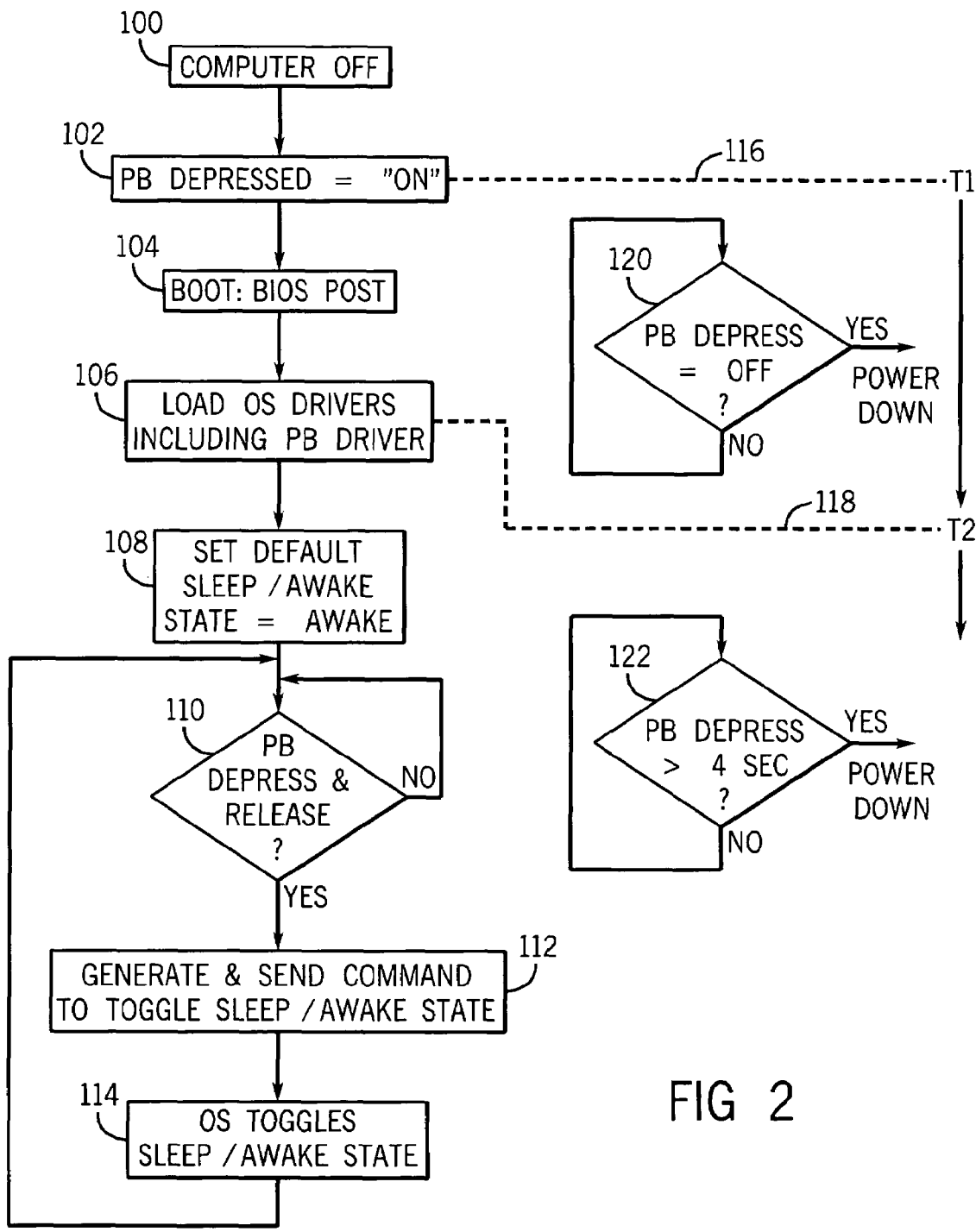
FIG. 2 is a flow diagram of an exemplary implementation of steps for controlling multiple functions based on input from the user by a single ON/OFF pushbutton switch.

FIG. 2 shows an exemplary implementation of steps which may be, but are not restricted to, being carried out by the circuitry of FIG. 1. In step 100, the computer is OFF, i.e. in a power down state requiring what is referred to as a cold start to be activated. In step 102 the PB is depressed and this is sensed to provide a power ON signal causing a cold start to be initiated. The step 104 reflects the boot sequence processing in which the basic input output system (BIOS) including a power ON self test (POST) provides initialization and start up processing. In step 106 the operating system (OS) drivers are loaded including the PB driver, i.e. a software interface module interfacing communications between the OS and the USB device representing PB operation. The PB driver defines the USB device commands associated with the exemplary implementation of the additional sleep/awake functionality associated with the PB.

In step 108 the default sleep/awake state is set to awake in accordance with the PB driver. A determination is made in step 110 of whether the PB has been depressed and released, i.e. pressed and released within a nominal action time associated with a user action such as within one second. A NO determination by step 110 results in a return to the beginning of the step thus monitoring for a PB depression by the user. A YES determination by step 110 is indicative that the user has pushed the PB as a command to toggle the sleep/awake state of the computer. In step 112 a command is generated and sent such as by microcontroller 34 as a USB signal carrying the HID command as an input to the operating system. The microcontroller 34 preferably stores or receives an input from the operating system indicating the current sleep/awake state of the computer so that an appropriate command toggling to the opposite state can be generated. In step 114 the operating system toggles the computer from the current sleep/awake state to the other of the sleep/awake state. Following the action by step 114, control returns to the determination step 110 to monitor for a further PB depression signaling the user's desire to again toggle the sleep/awake state.

Some of the functionality associated with the PB is dependent upon the time and/or conditions existing at the time of the PB activation. Dashed line 116 represents a time T1 following step 102. The dashed line 118 represents a time T2 just prior to loading of the PB driver in step 106. During the time frame between T1 and T2 a PB depression, indicating the desire by the user to power down the computer, is monitored by determination step 120 such as by the power ON/OFF system 18. A NO determination by step 120 results in a continued monitoring for a possible PB depression. A YES determination by step 120 initiates an immediate power down sequence of the computer. After time T2, a continuous depression of the PB for greater than 4 seconds corresponds to a YES determination by determination step 122 and is interpreted as a signal to power down the computer regardless of other conditions associated with an application program or the operating system. The determination step 122 continuously monitors for this condition which may be sensed by the system 22.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention. The decision-making and processing of the exemplary implementations may be implemented in firmware, software, hardware and combinations thereof. Depending upon the signal levels (voltage/current) accepted as inputs by chip 14 and debounce processing circuit 28, it may be desirable or convenient to utilize a level shifting buffer circuit in series with one of chip 14 and circuit 28. Although HID commands were selected to be transmitted over a USB interface, it will be apparent that other signaling formats could be utilized. Instead of using separate sleep and wake-up commands, a single command could be used to toggle a bi-sable device (or software) to cause the toggling of the computer between awake and sleep states. These modifications are offered merely as examples of possible changes that can be made and are not to be considered a listing of all possible changes. The scope of the invention is defined in the following claims.

What is claimed is:

1. A computer having an operating system comprising:
 a power ON/OFF pushbutton switch;
 a microcontroller coupled to receive ON/OFF information generated by the pushbutton switch;
 responsive to receiving the ON/OFF information, the microcontroller generates a command to cause the computer to toggle between sleep and awake states causing the operating system the change from one of the sleep and awake states to the other of the sleep and awake states.
 a universal serial bus (USB) is coupled to the microcontroller and carries said command causing the computer to toggle between sleep and wake-up states.

2. The computer of claim 1 further comprising a USB, interface system coupled to the USB, the USB interface system generating a USB command in response to receiving the microprocessor generated command, the USB interface system transmitting the USB command to an input of the operating system where the USB command comprises an instruction previously defined in the operating system to cause the operating system to toggle the computer from one of the sleep and awake states to the other of the sleep and awake states.

3. The computer of claim 2 wherein the USB interface system transmits the USB command in a format containing a human interface device command.

4. The computer of claim 1 further comprising an input/output chip coupled to the pushbutton switch to receive the ON/OFF information generated by the pushbutton switch, the input/output chip having a first output for carrying a power ON/OFF command coupled to the computer to effectuate the initial powering up of the computer and powering down of the computer during a time frame prior to drivers of the operating system having been loaded.

5. The computer of claim 4 wherein the input/output chip further has a second output for carrying a power down command coupled to the computer to effectuate the powering down of the computer after the drivers of the operating system have been loaded upon the input/output chip sensing that the pushbutton switch has been continuously in the OFF position for 4 seconds.

6. The computer of claim 2 further comprising an input/output chip coupled to the pushbutton switch to receive the ON/OFF information generated by the pushbutton switch, the input/output chip having a first output for carrying a power ON/OFF command coupled to the computer to effectuate the initial powering up of the computer and powering down of the computer during a time frame prior to drivers of the operating system having been loaded.

7. The computer of claim 6 wherein the input/output chip further has a second output for carrying a power down command coupled to the computer to effectuate the powering down of the computer after the drivers of the operating system have been loaded upon the input/output chip sensing that the pushbutton switch has been continuously in the OFF position for 4 seconds.

8. A computer having an operating system comprising:
a power ON/OFF pushbutton switch;
a microcontroller coupled to receive ON/OFF information generated by the pushbutton switch;
responsive to receiving the ON/OFF information, the microcontroller generates a command to cause the computer to toggle between sleep and awake states causing the operating system the change from one of the sleep and awake states to the other of the sleep and awake states;
wherein the microcontroller is responsive for generating the command to cause the computer to toggle between sleep and awake states only after a power button driver for the operating system has been loaded as part of a boot process of the computer.

9. The computer of claim 2 wherein the microcontroller is responsive for a generating the command to cause the computer to toggle between sleep and awake states only after a power button driver for the operating system has been loaded as part of a boot process of the computer.

10. A computer having an operating system comprising:
a switch means operable by the user for generating ON/OFF control information;
first means coupled to the switch means for controlling the powering ON and powering OFF of the computer in response to the ON/OFF control information;
second means coupled to the switch means for generating a sleep command and a wake-up command in response to the ON/OFF control information after a power button driver for the operating system has been loaded during boot-up processing, the second means transmitting one of the sleep and wake-up commands to the operating system to effectuate a change of the computer from one of a sleep and awake state to the other of the sleep and awake state;
wherein the second means further comprises means for generating a universal serial bus (USB) output signal for carrying the sleep and wake-up commands.

11. The computer of claim 10 wherein the sleep and wake-up commands are in a human interface device format.

12. The computer of claim 10 wherein the first means further comprises a first output for carrying a power ON/OFF command coupled to the computer to effectuate the initial powering up of the computer and powering down of the computer during a time frame prior to drivers of the operating system having been loaded.

13. The computer of claim 12 wherein the first means further comprises a second output for carrying a power down command coupled to the computer to effectuate the powering down of the computer after the drivers of the operating system have been loaded upon the first means sensing that the switch means has been continuously in the OFF position for 4 seconds.

14. The computer of claim 10 wherein the first means further comprises a first output for carrying a power ON/OFF command coupled to the computer to effectuate the initial powering up of the computer and powering down of the computer during a time frame prior to drivers of the operating system having been loaded.

15. The computer of claim 14 wherein the first means further comprises a second output for carrying a power down command coupled to the computer to effectuate the powering down of the computer after the drivers of the operating system have been loaded upon the first means sensing that the switch means has been continuously in the OFF position for 4 seconds.

16. A method for using a power ON/OFF pushbutton switch of a computer to derive control of additional computer functionality comprising the steps of:
loading a pushbutton driver for an operating system of the computer;
following the loading step, sensing whether the pushbutton switch is depressed and released by the user;
in response to sensing a depression and release of the pushbutton switch, generating and sending a command carried by a universal serial bus to the operating system to cause the operating system to toggle the computer from one of a sleep and awake state to the other of the sleep and awake state.

17. The method of claim 16 wherein the loading of the pushbutton driver is carried out as part of the boot-up process during an initial powering up of the computer.

18. The method of claim 16 further comprising the steps of sensing whether the pushbutton switch is depressed and released by the user prior to the loading of the pushbutton driver, and upon sensing that the pushbutton switch is depressed and released by the user prior to the loading of the pushbutton driver generating a power down command causing the computer to power down.

19. The method of claim 16 further comprising the steps of sensing whether the pushbutton switch is depressed continuously in an OFF position for 4 seconds by the user following the loading of the pushbutton driver, and upon sensing that the pushbutton switch is depressed continuously in the OFF position for 4 seconds generating a power down command coupled to the computer to effectuate the powering down of the computer.

20. An article, comprising:
one or more computer-readable signal-bearing tangible media; and
means in the one or more media for loading a pushbutton driver for an operating system of a computer;
means in the one or more media for sensing whether the pushbutton switch is depressed and released by the user following the loading of the pushbutton driver;
means in the one or more media for generating and sending a command by a universal serial bus to the operating system to cause the operating system to toggle the computer from one of a sleep and awake state to the other of the sleep and awake state in response to sensing a depression and release of the pushbutton switch.

21. The article of claim 20 further comprising means in the one or more media for sensing whether the pushbutton switch is depressed and released by the user prior to the loading of the pushbutton driver, and upon sensing that the pushbutton switch is depressed and released by the user prior to the loading of the pushbutton driver generating a power down command causing the computer to power down.

22. The article of claim 21 further comprising means in the one or more media for sensing whether the pushbutton switch is depressed continuously in an OFF position for 4 seconds by the user following the loading of the pushbutton driver, and upon sensing that the pushbutton switch is depressed continuously in the OFF position for 4 seconds generating a power down command coupled to the computer to effectuate the powering down of the computer.

23. A computer having an operating system comprising:
   a switch means operable by the user for generating ON/OFF control information;
   first means coupled to the switch means for controlling the powering ON and powering OFF of the computer in response to the ON/OFF control information;
   second means coupled to the switch means for generating a sleep command and a wake-up command in response to the ON/OFF control information after a power button driver for the operating system has been loaded during boot-up processing and while the computer is in a fully booted-up ON state, the second means transmitting one of the sleep and wake-up commands to the operating system to effectuate a change of the computer from one of a sleep and awake state to the other of the sleep and awake state.

24. An article, comprising:
   one or more computer-readable signal-bearing tangible media; and
   means in the one or more media for loading a pushbutton driver for an operating system of a computer;
   means in the one or more media for sensing whether the pushbutton switch is depressed and released by the user following the loading of the pushbutton driver and while the computer is in a fully booted-up ON state;
   means in the one or more media for generating and sending a command to the operating system to cause the operating system to toggle the computer from one of a sleep and awake state to the other of the sleep and awake state in response to sensing a depression and release of the pushbutton switch.

* * * * *